UNITED STATES PATENT OFFICE.

FRIEDRICH KNAPP, OF BRUNSWICK, GERMANY.

IMPROVEMENT IN CHEMICAL COMPOUNDS FOR TANNING HIDES AND SKINS.

Specification forming part of Letters Patent No. 193,521, dated July 24, 1877; application filed March 8, 1877.

*To all whom it may concern:*

Be it known that I, Dr. FRIEDRICH KNAPP, of Brunswick, in the Empire of Germany, have invented a new Chemical Compound for Tanning Hides and Skins, and process for obtaining said compound; and I do hereby declare that the following is a full, clear, and exact description of the same.

My invention supplies a basic sulphate of iron possessing new and valuable properties which fit it for new industrial applications, particularly the tanning of hides.

Physical qualities peculiar to this salt are as follows: In the dry state produced by slow evaporation from the mother-liquor, as hereinafter described, it is an orange-red transparent solid, resembling a solidified varnish, and of a much lighter color than the basic sulphate of iron hitherto known and described in chemical books, the latter being a brown-yellow salt, which decomposes on being boiled in aqueous solution.

The oxysalt produced by my improved process may, on the contrary, be boiled in a solution having the strength of from thirty (30) to forty (40) degrees Baumé without decomposing.

The basic sulphate of iron produced by my process has, moreover, the property of being copiously taken up by the skins of animals, in which it produces remarkable changes, making the salt a new and important reagent in tanning.

A process for tanning employing this substance as a reagent may form the subject of another application for Letters Patent.

The salt, when evaporated from its mother-liquor, as hereinafter described, produces a thick sirupy solution—a property which prominently distinguishes it from the basic sulphate of iron hitherto known to chemists.

My improved basic sulphate of iron is prepared as follows: To a boiling solution of sulphate of protoxide of iron (green vitriol) is added as much nitric acid as will thoroughly oxidize the salt contained in said solution. When the effervescence which ensues upon the addition of the nitric acid has subsided, the operation is reversed—that is, sulphate of protoxide of iron is added to the solution till said solution assumes a sirupy consistence—a distinguishing characteristic aforementioned—and acquires a yellow-red color, also characteristic of solutions of this iron oxysalt, which, when slowly evaporated to dryness, has the appearance of an orange-red transparent varnish, also highly characteristic.

The basic sulphate of iron thus produced has been demonstrated to have a high industrial value as a substitute for vegetable tanning principles in the manufacture of leather.

I claim—

1. The oxysalt, basic sulphate of iron, prepared as and having the physical properties described.

2. The process of preparing basic sulphate of iron, consisting in first adding nitric acid to the boiling solution of sulphate of protoxide of iron, and subsequently adding to the resulting solution a solution of sulphate of protoxide of iron, and either allowing the salt to remain in solution or evaporating the same to dryness, substantially as and for the purpose specified.

In testimony that I claim the foregoing I have hereunto set my hand this 30th day of January, 1877.

DR. FRED. KNAPP.

Witnesses:
P. SOMMERMEYER,
E. GOTTFRIEDSEN.